Oct. 16, 1956
H. T. ERICKSEN
2,766,642
SAW TRUING AND SETTING DEVICE
Filed July 8, 1955
2 Sheets-Sheet 1
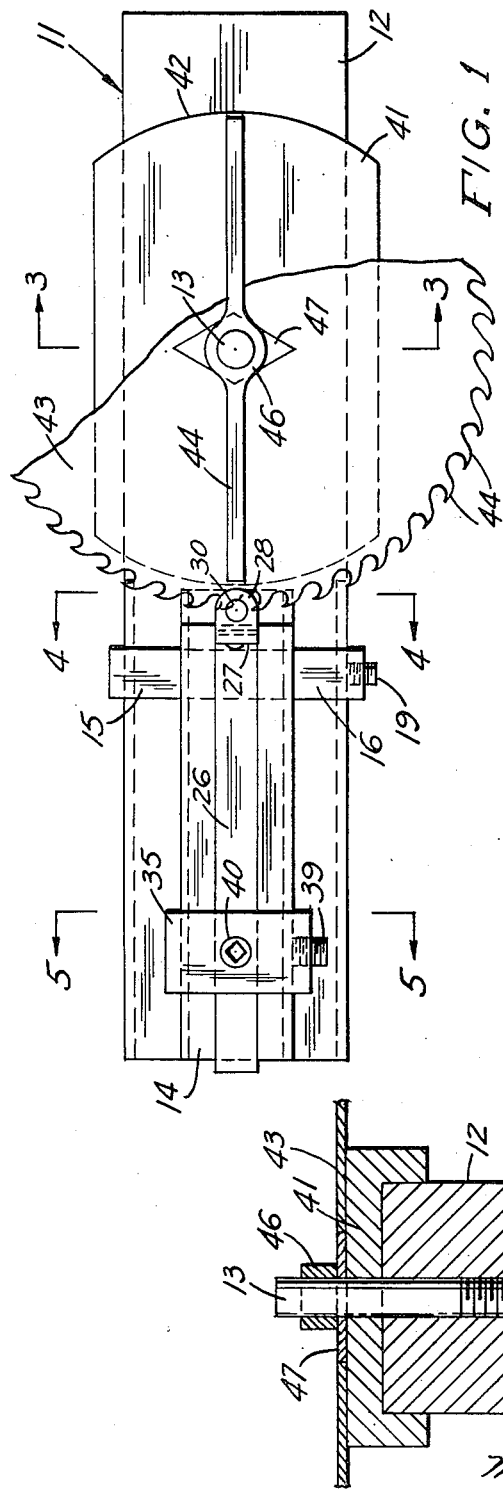
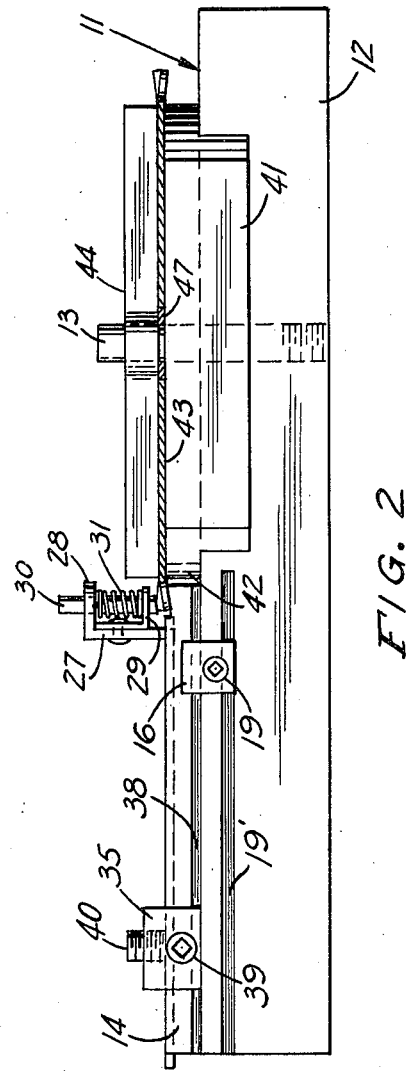
INVENTOR.
HOMER T. ERICKSEN
BY
McMorrow, Berman + Davidson
ATTORNEYS

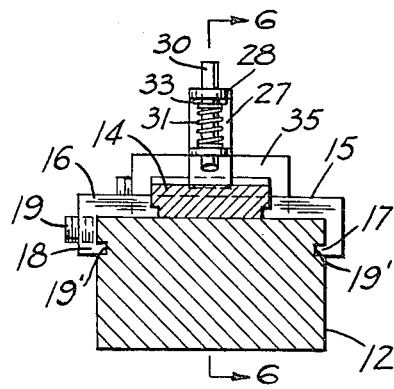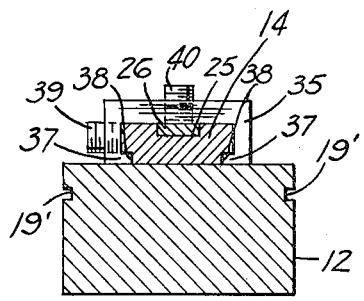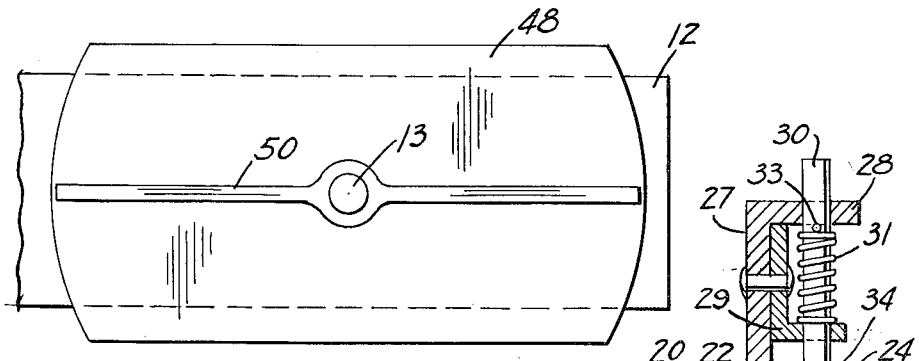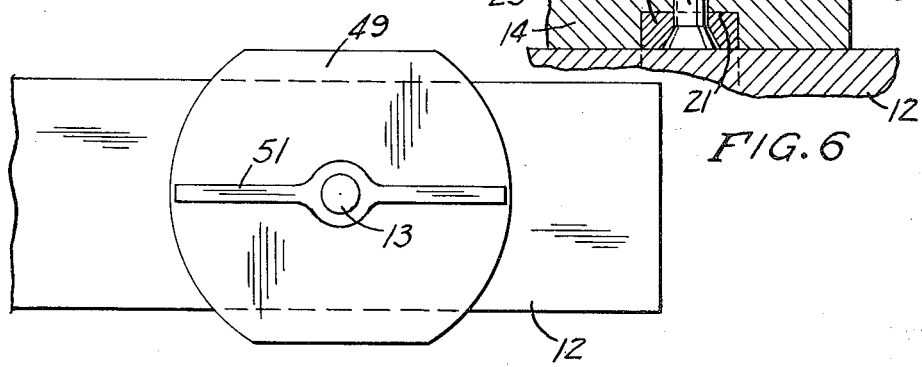

United States Patent Office 2,766,642
Patented Oct. 16, 1956

2,766,642

SAW TRUING AND SETTING DEVICE

Homer T. Ericksen, Milltown, Wis.

Application July 8, 1955, Serial No. 520,704

2 Claims. (Cl. 76—70)

This invention relates to saw setting and truing devices, and more particularly to an improved device for use in setting and jointing circular and other saw blades.

A main object of the invention is to provide a novel and improved saw setting and jointing device which is simple in construction, which is easy to set up for use, and which may be readily employed with saw blades of difference sizes.

A further object of the invention is to provide an improved device for aligning the teeth of and truing up circular and other saw blades, said device being inexpensive to manufacture, being durable in construction, being easy to adjust in accordance with the size of the blade to be repaired, and involving only a few parts.

Further objects and advantages of the invention will become apparent from the following description and claims, and from the accompanying drawings, wherein:

Figure 1 is a top view of an improved device for aligning the teeth of and truing up a saw blade, in accordance with the present invention, shown with a fragmentary portion of a circular saw blade positioned thereon.

Figure 2 is a side elevational view of the device of Figure 1 with the saw blade shown in vertical cross section.

Figure 3 is a transverse vertical cross sectional view taken on the line 3—3 of Figure 1.

Figure 4 is a transverse vertical cross sectional view taken on the line 4—4 of Figure 1.

Figure 5 is a transverse vertical cross sectional view taken on the line 5—5 of Figure 1.

Figure 6 is an enlarged cross sectional detail view taken on the line 6—6 of Figure 4.

Figure 7 is a fragmentary top view of the device of Figure 1, shown with a supporting channel member for use with a relatively large circular saw blade.

Figure 8 is a fragmentary top view, similar to Figure 7, but showing the substitution of a channel shaped blade supporting member for use with a relatively small circular saw blade.

Referring to the drawings, the improved saw blade aligning and truing device of the present invention is designated generally at 11 and comprises a horizontal, generally rectangular support block 12 having a vertical, upstanding post member 13 threadedly secured in one end portion thereof, as shown in Figure 3.

Designated at 14 is a bar member which is slidably mounted longitudinally on the other end porion of the block 12 and which is formed with a pair of opposing transverse arms 15 and 16 which are shaped to engage over the opposite side edges of the bar 14 and which are formed with inwardly projecting lug elements 17 and 18 slidably engaging in respective longitudinal grooves 19' formed in the opposite sides of block 12, to guide the longitudinal bar 14 for longitudinal adjustment along block 12. The arm 16 is provided with a set screw 19 in its vertical outer portion, as shown in Figure 4, said set screw 19 being clampingly engageable with the top portion of the side surface of block 12 to lock the bar 14 in an adjusted position.

As shown in Figure 6, the arms 15 and 16 comprise the opposite ends of a transversely extending bar 20 secured in a transverse groove 21 formed in the bottom of the bar 14, the transverse bar 20 being secured to the bar 14 by a vertical rivet 22, as shown. The forward end of the bar 14 is formed with the flared portion 23 having the upwardly and forwardly inclined top surface 24 adapted to serve as an anvil element for supporting a saw tooth as the tooth is aligned by the punch member of the device, as will be presently described.

The longitudinal bar 14 is formed with a longitudinal top groove 25, as shown in Figure 5, in which is slidably mounted a longitudinal bar element 26 formed at its forward end with a vertical upstanding bracket portion 27 having the horizontal, forwardly extending top arm 28. Secured to the bracket portion 27 below the arm 28 is the angle member 29. A vertical punch element 30 is slidably engaged through vertically registering apertures in arm 28 and in the horizontal arm portion of the member 29, said punch member 30 being biased upwardly by a coil spring 31 surrounding the punch element between the arm 28 and the horizontal portion of the angle member 29 and bearing between said horizontal arm portion of the member 29 and the transverse pin 33 extending through the upper portion of the punch member 30, as shown in Figure 6.

The bottom end of the punch member 30 is inclined so as to be parallel to the inclined surface 24, as shown at 34 in Figure 6, the punch member 30 being located over the inclined surface 24 so that a saw tooth may be received between the inclined bottom end 34 of the punch member 30 and the anvil surface 24 in a manner presently to be described.

Designated at 35 is a generally C-shaped clamping bracket which transversely overlies the bar 14 and the bar element 26, the member 35 having inturned lug elements 37, 37 which slidably engage the respective longitudinal grooves 38 provided in the opposite sides of the bar member 14. A set screw 39 is provided in one of the arms of the bracket member 35, said set screw being clampingly engageable with the side surface of bar 14 to secure the bracket member 35 in fixed position on the bar 14. A set screw 40 is provided in the intermediate portion of the top arm of bracket member 35, the set screw 40 being clampingly engageable with the bar element 26 to lock the bar element 26 in a fixed position with respect to the bar 14.

From the above it will be readily apparent that the bar 14 is readily adjustable longitudinally to the correct position to receive a saw tooth on the anvil surface 24 thereof, and that the punch member 30 is also adjustable so that it will accurately overlie said anvil surface 24.

Designated at 41 is a first-channel shaped blade supporting member which is dimensioned so as to snugly fit over the block 12, as shown in Figure 3, the member 41 being provided with a central aperture to receive the upstanding post member 13. The member 41 has the respective arcuate end edges 42 of common radius and of a radius such that a circular saw blade 43 will be supported on the member 41 with its teeth 44 projecting fully beyond the arcuate edge 42 of the support member 41. Thus, as shown in Figure 2, the blade 43 may be disposed on the support member 41 with the teeth thereof projecting beyond the arcuate edge 42 of the support member and with the block 12 adjusted so that the said teeth can be received on the inclined anvil surface 24 and can be set to their proper angles by impact furnished to the punch member 33 located over the anvil surface 24.

Designated at 44 is a levelling member comprising a straight arm formed at its intermediate portion with an apertured enlargement 46 shaped to slidably receive the top portion of the post member 13, as shown in Figure 3, the respective arms of the member 44 being of course in alignment with each other and extending diametrically over the saw blade 43 when the blade is in the position thereof shown in Figures 1, 2 and 3. By rotating the arm 44 around the post member 13, the blade can be trued to a substantially planar configuration, and alternatively, the level arm 44 may be employed to merely detect warping of the blade so that the blade may be flattened by some other suitable means, if such is found to be necessary.

As shown in Figure 3, a suitable filler 47 may be employed between the post member 13 and the central aperture in the saw blade so as to accurately center the saw blade with respect to the post member 13.

As will be readily understood, the teeth of the saw blade are successively set by rotating the blade after each operation of the punch member 30. After a first set of teeth have been properly set on the blade, the blade is turned over to its opposite face and the alternate set of teeth may then be set by a repetition of the preceding operation.

For relatively large circular saw blades, a channel member of correspondingly increased length may be employed, as shown at 48 in Figure 7, and for smaller circular saw blades, a relatively short channel-shaped support member 49 may be employed. With the long channel-shaped member 48, a correspondingly longer levelling arm 50 may be employed, as shown in Figure 7, and with the short channel-shaped supporting member 49, a correspondingly short levelling arm 51 may be employed, as shown in Figure 8.

While a specific embodiment of an improved device for aligning the teeth of and truing up a saw blade has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A device for aligning the teeth of and truing up a saw blade comprising a horizontal support member having parallel longitudinal sides, a channel-shaped member having an arcuate end, said channel-shaped member being shaped to closely fit transversely over said support member, a vertical post member secured on said support member and extending through said channel-shaped member, said post member being engageable through the central aperture of a circular saw blade when the blade is disposed horizontally on the channel-shaped member, a bracket member slidably supported on said support member for adjustment toward and away from said arcuate end, means clampingly securing said bracket member to adjusted position on said support member, an apertured guide member slidably mounted on said bracket member adjacent said arcuate end, means clampingly securing said guide member in adjusted position on said bracket member, said bracket member being provided beneath said guide member with an inclined bearing surface located adjacent said arcuate ends, and a vertical plunger member slidably mounted in said guide member over said bearing surface and being engageable with a saw blade tooth disposed over said inclined bearing surface.

2. A device for aligning the teeth of and truing up a saw blade comprising a horizontal support member having parallel longitudinal sides, a channel-shaped member having an arcuate end, said channel-shaped member being shaped to closely fit transversely over said support member, a vertical post member secured on said support member and extending through said channel-shaped member, said post member being engageable through the central aperture of a circular saw blade when the blade is disposed horizontally on the channel-shaped member, a bracket member slidably supported on said support member for adjustment toward and away from said arcuate end, means clampingly securing said bracket member in adjusted position on said support member, an apertured guide member slidably mounted on said bracket member adjacent said arcuate end, means clampingly securing said guide member in adjusted position on said bracket member, said bracket member being provided beneath said guide member with an inclined bearing surface located adjacent said arcuate end, a vertical plunger member slidably mounted in said guide member over said bearing surface and being engageable with a saw blade tooth disposed over said inclined bearing surface, and a straight levelling arm engageable horizontally on said post member over said channel-shaped member.

References Cited in the file of this patent

UNITED STATES PATENTS

| 396,823 | Logan | Jan. 29, 1889 |
| 1,029,614 | Johnson | June 18, 1912 |
| 1,263,191 | Benner | Apr. 16, 1918 |
| 2,293,231 | Weiland | Aug. 18, 1942 |

FOREIGN PATENTS

| 852,639 | Germany | Oct. 16, 1952 |